Patented Nov. 21, 1950

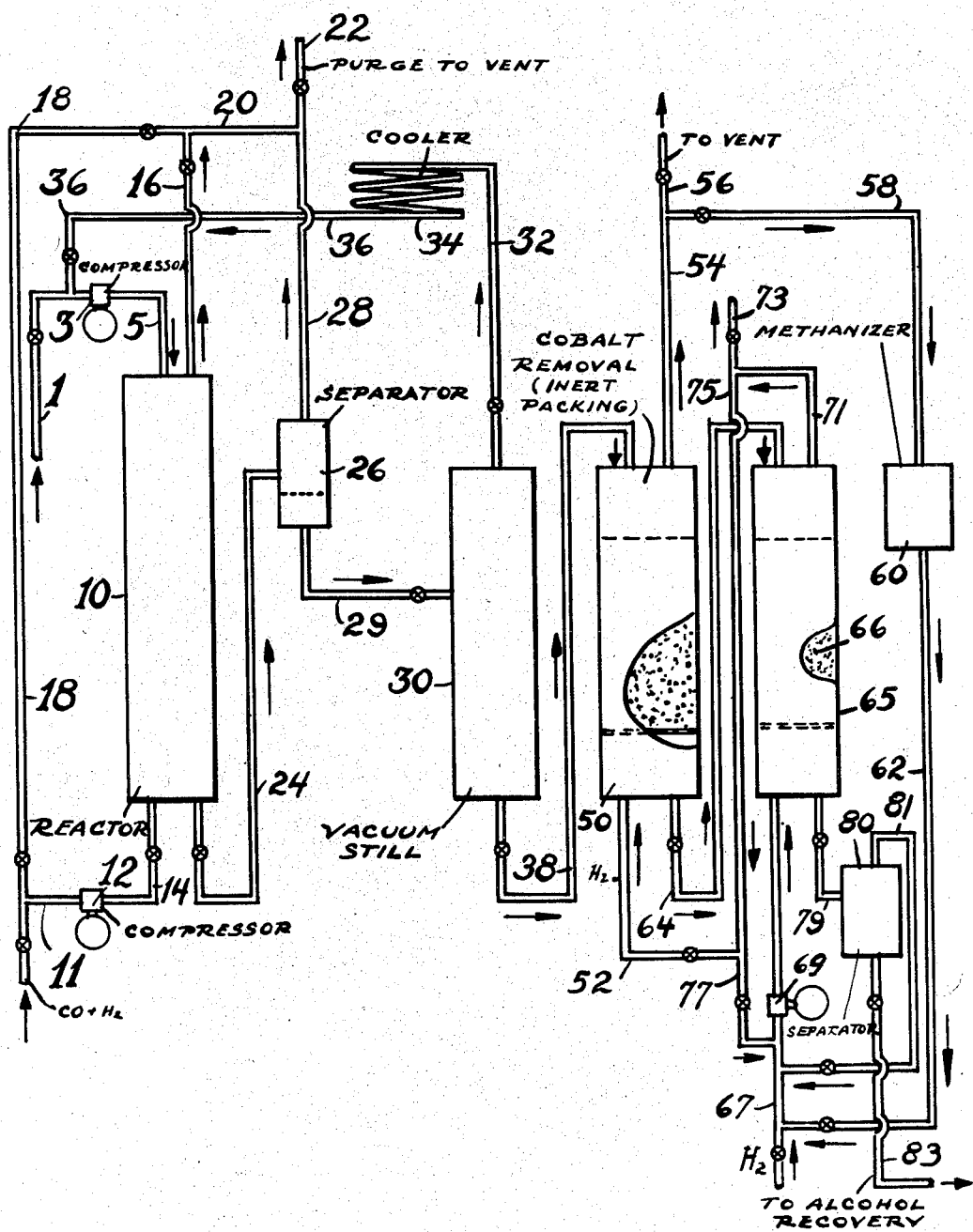

2,530,989

UNITED STATES PATENT OFFICE 2,530,989

SYNTHESIS OF OXYGENATED ORGANIC COMPOUNDS

Paul T. Parker, Baton Rouge, La., assignor to Standard Oil Development Company, a corporation of Delaware Application June 5, 1947, Serial No. 752,800

9 Claims. (Cl. 260—632)

The present invention relates to the production of oxygenated organic compounds by the reaction of olefins with hydrogen and carbon monoxide and more specifically to means for improving olefin utilization in processes of this type.

It is well known in the art that oxygenated organic compounds may be synthesized from olefins or diolefins by a reaction with carbon monoxide and hydrogen in the presence of catalysts containing cobalt, iron, nickel, or the like in a two-step process in which predominantly aldehydes and ketones and minor proportions of alcohols are formed in a first-stage in the presence of the catalysts mentioned above and the product from the first step is hydrogenated in a second step to convert aldehydes and ketones into the corresponding alcohols. The catalyst used in the first stage may be employed in the second stage. However, other known hydrogenation catalysts may be used in the latter stage such as metallic nickel, nickel supported on kieselguhr, and others. The catalyst for the first stage usually contains promoters such as thoria, magnesia and the like.

The alcohols produced by this process normally contain one more carbon atom than the olefin used as the starting material, the position of the added hydoxyl group depending on the position of the double bond in the olefin. The olefins to be used as starting material may therefore be selected as a function of the purpose for which the product alcohol is desired.

For example, a detergent such as sodium lauryl sulfate may be prepared from an olefinic such as undecene-1 by the alcohol synthesis. Other olefins and diolefins such as ethylene, propylene, butylene, pentenes, hexenes, butadiene, pentadienes, olefin polymers such as diisobutylene, triisobutylene, polypropylenes and olefinic fractions from the hydrocarbon synthesis process, thermal or catalytic cracking operations, and other sources may be used as starting material depending on the nature of the aldehydes and alcohols desired. The olefins fed may comprise pure olefins or hydrocarbon mixtures containing olefins. In general, olefins having from 2 to 10 carbon atoms and, more particularly, from 8 to 18 carbon atoms in the molecule are preferred.

The synthesis gas mixture containing hydrogen and carbon monoxide may be produced from any conventional sources such as carbonaceous solids or gases in any manner known per se and in any desired ratio of hydrogen to carbon monoxide. Ratios of 0.5 volume of hydrogen to 4.0 volumes of hydrogen per volume of carbon monoxide may be employed, about 1.0 volume of hydrogen per volume of carbon monoxide being preferred. The reaction of the olefins with $H_2$ and CO is generally conducted at pressures in the range of about 100 to 300 atmospheres and temperatures in the range of about 150° F. to 450° F.

The quantity of $H_2+CO$ with respect to olefins used may vary within wide ranges, for example from 1000 to 45,000 cu. ft. of $H_2+CO$ per barrel of olefin feed. In general, approximately 2500 to 15,000 cu. ft. of $H_2+CO$ per barrel of olefin feed are employed. In the hydrogenation step temperatures are generally within the range of from about 150° F. to 450° F. while pressures within the range of about 100 to 300 atmospheres are suitable.

The catalysts for the first stage of the process are usually employed in the form of soaps of the catalytically active metal with high molecular weight fatty acids such as stearic, palmitic, oleic, naphthenic, linoleic, and similar acids of natural or synthetic arigin. For example, metal soaps such as cobalt stearate, nickel oleate, cobalt naphthenate and iron linoleate are suitable catalysts. These salts are soluble in the liquid olefin feed and may be supplied to the reaction zone in the form of hydrocarbon solutions or dissolved in the olefin feed.

In the conventional operation of this process, it has been customary to pass the total oxygenated product from the first stage together with unreacted olefins to the second stage wherein it is hydrogenated. The unconverted olefins are thus hydrogenated in the second stage to form saturated hydrocarbons which are of little value and which constitute a loss in the economics of the process. The present invention has for its principal object to provide means for an economic utilization in the process, of olefins which remain unreacted in a single pass through the first stage of the process.

In accordance with the present invention, this object may be accomplished by subjecting the total product from the oxygenation stage of the process to a distillation treatment adapted to separate unreacted olefins from oxygenated products and recycling the olefins so separated to the oxygenation stage.

Experiments have demonstrated that special care must be taken during the distillation treatment to prevent excessive condensation of desirable aldehydes, which may lead to an excessively high percentage of undesirable heavy bottoms in the hydrogenation product. According to the invention such aldehyde condensation may be substantially suppressed or completely prevented by carrying out the distillation of the total oxygenated product under reduced pressures of, say, about 5 to 500 mm. Hg depending on the boiling range of the olefins originally charged. More specifically, when using olefins boiling at about 200°–225° F. at atmospheric pressure, distillation pressures of about 10–50 mm. Hg are adequate, at a temperature of about 70°–150° F. This may be accomplished most advantageously by a flash distillation in which the hot product effluent from the first, i. e., the oxygenation stage, of the process is released to a low pressure zone maintained at a reduced pressure within the range just specified. In this manner the sensible heat of the liquid product from the oxygenation stage is utilized for distilling or flashing the olefins. The oxygenated constituents may thereafter be passed on to a conventional hydrogenation stage while the separated olefins are recycled to the oxygenation stage.

The invention will be best understood from the following detailed description read with reference to the accompanying drawing, the single figure of which illustrates schematically a system suitable for carrying out a preferred embodiment of the invention.

Referring now to the drawing, a mixture of feed olefins and dissolved oxygenation catalyst is supplied from line 1 by compressor 3 through line 5 to oxygenation reactor 10. The olefins which may be obtained from any conventional source may have a boiling range of, say, about 100° to 500° F., preferably not substantially below 150° F. While any conventional oxygenation catalyst may be used, it has been found that good results may be obtained when employing soaps of iron, cobalt and nickel with high molecular weight fatty acids produced by the catalytic hydrocarbon synthesis from carbon monoxide and hydrogen.

Hydrocarbon synthesis products, especially those boiling above 300° F., contain from 5 per cent to 10 percent or more acids which are extractible with caustic solutions. Experimental work has shown that particularly the cobalt salts of these acids are effective catalysts for the synthesis of oxygenated materials from olefins and synthesis gas. This is illustrated by the following experiments.

Thirty-five grams of the acids extracted from a 350° to 400° F. cut of hydrocarbon synthesis product were neutralized with a solution of 80 grams NaOH in 600 cc. of hot water. To this solution were added 100 cc. of an aqueous solution of 24 grams hydrated cobaltous chloride. The mixture was digested for two hours on a hot plate, washed with hot water, and the gummy precipitate dried in a vacuum oven.

A solution of 3.6 grams of cobalt salt prepared as described above was dissolved in a mixture of 360 grams of diisobutylene and 14.4 grams C9 alcohols. The solution was treated for five hours at 3000 pounds per square inch synthesis gas pressure and a temperature of 300° F. Distillation of the product formed showed 79 per cent of the diisobutylene was converted to oxygenated material.

Returning now to the drawing, the liquid olefins in reactor 10 containing about 0.05 to 0.5 per cent of active metal component of an oxygenation catalyst are passed downwardly and countercurrently to synthesis gas supplied to the bottom of reactor 10 by compressor 12 through line 14 at a pressure of about 3000 pounds per square inch. The ratio of $H_2:CO$ in the synthesis gas is preferably maintained at about 1:1 and the synthesis gas is supplied at a substantial excess over that theoretically required for the conversion of the olefins. This excess may amount to about three to thirty times the theoretical amount. Reactor 10 is preferably maintained at a temperature of about 250° to 400° F. Unconverted synthesis gas is withdrawn overhead from reactor 10 through line 16 and may be recycled through line 18 to synthesis feed gas line 11 and from there to reactor 10. Inert constituents may be purged from line 16 through lines 20 and 22.

The liquid reaction product containing some gas dissolved and/or suspended is withdrawn from a lower portion of reactor 10 through line 24 and passed to a separator 26 wherein gases are separated from the liquid product. Separated gases may be withdrawn from separator 26 through line 28 and returned to reactor 10 through line 18. Undesirable gas constituents may be purged through line 22.

The liquid product in separator 26 which is still substantially at the temperature and pressure of reactor 10 is withdrawn through line 29 and flashed into the low pressure vacuum still 30. At the oxygenation conditions indicated above, still 30 may be operated at a suitable pressure within the range of about 5 to 500 mm. Hg and a temperature just high enough to flash off unconverted olefins. Under these conditions unconverted olefins may be taken overhead from still 30 through line 32. The olefinic overhead is condensed in cooler 34 and returned through line 36 to olefin feed line 1 and from there via compressor 3 and line 5 to reactor 10. In this manner the olefinic feed may be substantially completely converted into oxygenated compounds of a relatively higher boiling range while aldehyde condensation in still 30 is substantially avoided.

The portions of the system described above comprise the essential novel elements of the present invention. The remaining portions of the system are essentially standard equipment which may be operated in any conventional manner. A brief outline of a typical method of operation will be given below.

Liquid oxygenated products are withdrawn from the bottom of still 30 and passed through line 38 to a catalyst removal zone 50 which is packed with a catalytically inert solid material such as pumice, ceramic packing, silica gel, alumina, etc. Hydrogen recovered from a later stage of the process, as will appear hereinafter, may be supplied to zone 50 through line 52 and passed through zone 50 countercurrently to the liquid oxygenated product. Catalyst removal zone 50 is preferably maintained at a temperature of about 200° to 400° F. at which the catalyst which enters zone 50 predominantly in the form of metal carbonyl is decomposed to metal and carbon monoxide. The metal is deposited on the inert packing within zone 50 while the carbon monoxide is purged by the hydrogen. A mixture of hydrogen and carbon monoxide is withdrawn through line 54 either to be discarded through line 56 or to be passed through line 58 to a methanizer 60 wherein it is converted thermally or catalytically into methane in any conventional manner. The hydrogen-methane mixture may be passed through line 62 to hydrogenation reactor 65.

The liquid oxygenated product now free of oxygenation catalyst is withdrawn from zone 50 through line 64 and passed to a top portion of hydrogenation reactor 65. Simultaneously, hydrogen is supplied to reactor 65 through line 67 by compressor 69 in proportions sufficient to convert the aldehydes and ketones contained in the oxygenated feed into the corresponding alcohols. Reactor 65 contains a mass 66 of any conventional hydrogenation catalyst. For example, when nickel is employed as the hydrogenation catalyst, reactor 65 may be operated at pressures ranging from about 300 to 3000 pounds per square inch, at temperatures of about 200° to 400° F. and at a hydrogen feed of about 5000 to 15,000 normal cu. ft. per barrel of feed. The catalyst may be employed in the form of fixed or moving beds or it may be suspended in the liquid feed. Details of hydrogenation processes of this type are well known in the art and need not be further specified. Unreacted hydrogen may be withdrawn overhead from reactor 65 through line 71 and either vented through line 73 or recycled through line 75 via lines 52 and/or 77 to the catalyst removal zone 50 as previously described or hydrogenation reactor 65. The hydrogenated product stream is withdrawn from reactor 65 through line 79 and may be passed to a separator 80 in which entrained gas may be separated from the liquid product. Hydrogen separated in separator 80 may be recycled through line 81 to hydrogen feed line 67. Final liquid alcohol product is withdrawn through line 83. It may be passed to any conventional product recovery system (not shown).

The system illustrated by the drawing permits of various modifications. Other conventional oxygenation catalysts than those specified may be supplied to line 1. For example, insoluble finely divided metal catalysts may be used in aqueous or oil suspension. Instead of nickel other hydrogenation catalysts such as tungsten, or sulfides of metals of groups VI and VIII of the periodic table may be utilized. Further modifications may occur to those skilled in the art without deviating from the spirit of the invention.

The superiority of the present invention over customary procedures will be further substantiated by the following experiments.

An oxygenated material was produced from olefins and synthesis gas as follows:

A diisobutylene feed containing 1% dissolved cobalt stearate and 4% $C_9$ alcohol as a solubilizer for the catalyst was treated continuously with $H_2+CO$ in the ratio of 1:1 at a pressure of 3000 lbs. per sq. in. gauge and at 300°–315° F. reaction temperature in a reactor packed with 300 cc. of silica gel. The olefin feed was passed through the reactor at a rate of 75–150 cc. per hour with synthesis gas introduced at an average rate of about 10,000 cu. ft/bbl. of olefin feed. The product from this operation contained 56.2 wt. per cent of oxygenated material and 43.8 wt. per cent of unconverted olefin.

To a portion of this oxygenated material there was added about 0.19 per cent by weight of p-tertiary-butyl-catechol as a polymerization inhibitor. One sample of the original oxygenated product and a sample of the portion containing the p-tertiary-butyl catechol were separately distilled at atmospheric pressure. A second sample of the original product was distilled at 10 mm. Hg pressure in accordance with the invention. The products from these three experiments were separately hydrogenated on nickel-on-kieselguhr catalyst containing about 60% Ni, at a temperature of 350° F., a pressure of 2700 pounds per square inch gauge, for about 12 hours. The results obtained are summarized below.

| Unreacted Olefin Removed by Distillation at— | Atm. Press. | Atm. Press.[1] | 10 mm. Hg |
|---|---|---|---|
| Hydrogenated Product Distillation Summary: | | | |
| Init.—250° F., Wt. per cent. | 6.1 | 5.0 | 10.0 |
| 250°–350° F., Wt. per cent | 0.0 | 0.6 | 0.0 |
| 350–380° F., Wt. per cent | 42.3 | 30.5 | 63.1 |
| Bottoms, Wt. per cent | 51.6 | 63.9 | 26.9 |

[1] In presence of p-tertiary-butyl catechol.

The above data indicate that effective suppression of $C_9$ aldehyde condensation is accomplished by the reduced pressure distillation of the present invention, while distillation in the presence of a condensation inhibitor at normal pressure is not effective for the prevention of aldehyde condensation.

While the foregoing description and exemplary operations have served to illustrate specific applications and results of the invention, other modifications obvious to those skilled in the art are within the scope of the invention. Only such limitations should be imposed on the invention as are indicated in the appended claims.

I claim:

1. In the production of oxygenated organic compounds by reacting olefins with CO and $H_2$ in an oxygenation zone at oxygenation conditions of temperature and pressure in the presence of an oxygenation catalyst the improvement which comprises withdrawing a mixture of oxygenated products and unconverted olefins from said oxygenation zone, distilling said mixture, in the presence of dissolved oxygenation catalyst and prior to further conversion, at a reduced pressure of about 5 to 500 mm. Hg adapted to separate unconverted olefins from oxygenated products without excessive condensation of aldehydes and recycling said separated olefins to said oxygenation zone.

2. The process of claim 1 in which said oxygenated products after said reduced pressure distillation are hydrogenated at hydrogenation conditions of temperature and pressure and in the presence of a hydrogenation catalyst adapted to convert aldehydes and ketones into the corresponding alcohols.

3. The process of claim 1 in which said catalyst comprises the salt of a metal selected from the group of cobalt, iron and nickel with a high molecular weight fatty acid recovered from the liquid product of the catalytic synthesis of hydrocarbons from CO and $H_2$.

4. The process of claim 1 in which said reduced pressure is substantially lower than said oxygenation pressure and said mixture is flashed from a zone maintained substantially at said oxygenation pressure and at a temperature not substantially below said oxygenation temperature into a distillation zone maintained at said reduced pressure so as to utilize the sensible heat of said mixture for its distillation in said distillation zone.

5. In the production of oxygenated organic compounds by reacting olefins in the liquid state with CO and $H_2$ in an oxygenation zone at oxygenation conditions of elevated temperatures and pressures in the presence of an oxygenation catalyst, the improvement which comprises withdrawing a liquid mixture of oxygenated products and unconverted olefins substantially at said oxygenation temperature and pressure from said oxygenation zone, passing said withdrawn mixture, in the presence of dissolved oxygenation catalyst and prior to further conversion, into a reduced-pressure distillation zone maintained at a reduced pressure of about 5 to 500 mm. Hg and a temperature adapted to distill unconverted olefins from liquid oxygenated products without excessive condensation of aldehydes, withdrawing olefin vapors from said distillation zone, separately withdrawing liquid oxygenated product from said distillation zone, condensing said olefin vapors, and returning said condensed olefins to said oxygenation zone.

6. The process of claim 5 in which said withdrawn mixture is freed in a separation zone of entrained gases, prior to being passed to said distillation zone.

7. The process of claim 6 in which said separation zone is maintained at a temperature and pressure adapted to maintain unconverted olefins in the liquid state.

8. The process of claim 5 in which said withdrawn oxygenated product after said reduced pressure distillation is hydrogenated in the liquid state with a hydrogenating catalyst and at pressures and temperatures adapted to convert aldehydes present in said oxygenated product into the corresponding alcohols.

9. In the production of oxygenated organic compounds in a continuous process by reacting olefins with CO and $H_2$ in an oxygenation zone at oxygenation conditions of temperature and pressure in the presence of an oxygenation catalyst which catalyst dissolves at least in part in the oxygenated product, removing the dissolved oxygenating catalyst from the oxygenated product, hydrogenating the so treated oxygenated product to form alcohols, and recovering the alcohols formed by distillation the improvement which comprises distilling the said oxygenated product, prior to said catalyst removal and hydrogenation, at a reduced pressure of about 5 to 500 mm. Hg adapted to separate unconverted olefins from oxygenated products without excessive condensation of aldehydes and recycling said separated olefins to said oxygenation zone.

PAUL T. PARKER.

REFERENCES CITED

The following references are of record in the file of this patent:

UNITED STATES PATENTS

| Number | Name | Date |
|---|---|---|
| 2,151,106 | Hentrich et al. | Mar. 21, 1939 |
| 2,153,526 | Walker | Apr. 4, 1939 |
| 2,327,066 | Roelen | Aug. 17, 1943 |
| 2,415,102 | Landgraf et al. | Feb. 4, 1947 |

OTHER REFERENCES

Hasche and Boundy, "Report on Inspection of the Oxo Plant at Ruhr-chemie Oberhausen-Holden," C. I. O. S. Target No. C22/196, Miscellaneous Chemicals, pages 3 and 4, June 18, 1945.

U. S. Naval Technical Mission in Europe, Technical Report No. 248—45. "The Synthesis of Hydrocarbons and Chemicals from CO and $H_2$, pages 122, 123 and 124, Sept. 1945.